United States Patent
Lin et al.

(10) Patent No.: US 9,742,279 B2
(45) Date of Patent: Aug. 22, 2017

(54) INTERLEAVED BUCK CONVERTER

(71) Applicant: LITE-ON TECHNOLOGY CORP., Taipei (TW)

(72) Inventors: Jing-Yuan Lin, Taipei (TW); Tse-Wei Chao, Hsinchu County (TW); Yao-Ching Hsieh, Kaohsiung (TW); Huang-Jen Chiu, Taipei (TW); Yu-Kang Lo, Taipei (TW); Po-Jung Tseng, Taipei (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 15/003,931

(22) Filed: Jan. 22, 2016

(65) Prior Publication Data

US 2017/0126125 A1  May 4, 2017

(30) Foreign Application Priority Data

Oct. 29, 2015 (CN) .......................... 2015 1 0724338

(51) Int. Cl.
*H02M 3/158* (2006.01)
*H02M 1/00* (2006.01)

(52) U.S. Cl.
CPC ......... *H02M 3/158* (2013.01); *H02M 3/1584* (2013.01); *H02M 2003/1586* (2013.01)

(58) Field of Classification Search
CPC ....... H02M 3/1584; H02M 2003/1586; H02M 2001/0058
See application file for complete search history.

(56) References Cited

U.S. PATENT DOCUMENTS

| | | | | |
|---|---|---|---|---|
| 6,211,657 B1* | 4/2001 | Goluszek | ............ | H02M 3/1584 323/272 |
| 6,897,641 B1* | 5/2005 | Herbert | ............... | H02M 3/1584 323/282 |
| 7,110,265 B2* | 9/2006 | Liu | ........................ | H02M 3/158 363/16 |
| 7,317,305 B1* | 1/2008 | Stratakos | ............. | H02M 3/157 323/282 |
| 8,654,551 B2* | 2/2014 | Sase | ...................... | H02M 7/217 363/65 |
| 8,716,991 B1* | 5/2014 | Ikriannikov | ........ | H01F 27/2804 323/272 |
| 9,306,458 B2* | 4/2016 | Khayat | ................ | H02M 3/158 |
| 9,537,412 B2* | 1/2017 | Qu | .................... | H02M 3/33576 |
| 2002/0118000 A1* | 8/2002 | Xu | ........................ | H02M 3/158 323/259 |
| 2004/0246748 A1* | 12/2004 | Xu | .................... | H02M 3/33569 363/17 |
| 2008/0157743 A1* | 7/2008 | Martin | ................ | H02M 3/1584 323/284 |

(Continued)

*Primary Examiner* — Timothy J Dole
*Assistant Examiner* — Sisay G Tiku
(74) *Attorney, Agent, or Firm* — Rosenberg, Klein & Lee

(57) ABSTRACT

An interleaved buck converter performs buck conversion by controlling operation of each of two switches thereof between an ON state and an OFF state. The switches have the same switching period and the same ON time interval, and a time delay from switching of one of the switches into the ON state to switching of the other one of the switches into the ON state equals the ON time interval of the switches minus a predetermined time interval.

9 Claims, 12 Drawing Sheets

(56) References Cited

U.S. PATENT DOCUMENTS

| | | | |
|---|---|---|---|
| 2012/0319667 A1* | 12/2012 | Nair | H02M 3/1582 323/282 |
| 2015/0002115 A1* | 1/2015 | Shenoy | H02M 3/1584 323/271 |
| 2015/0115917 A1* | 4/2015 | Yu | H02M 3/1584 323/272 |

* cited by examiner

INTERLEAVED BUCK CONVERTER

CROSS-REFERENCE TO RELATED APPLICATION

This application claims priority of Chinese Application No. 201510724338.6, filed on Oct. 29, 2015.

FIELD

This disclosure relates to power conversion, and more particularly to an interleaved buck converter.

BACKGROUND

A conventional interleaved buck converter performs power conversion by controlling operation of each of two switches thereof between an ON state and an OFF state. The switches have the same switching period with the same duty cycle, and a time delay from switching of one of the switches into the ON state to switching of the other one of the switches into the ON state equals half the switching period of the switches. When the duty cycle is greater than 50%, both of the switches enter the ON state with zero voltage switching (ZVS). When the duty cycle is less than 50%, none of the switches enters the ON state with ZVS. Therefore, the conventional interleaved buck converter disadvantageously has relatively low conversion efficiency when the duty cycle is small.

SUMMARY

Therefore, an object of this disclosure is to provide an interleaved buck converter that can alleviate the drawback of the prior art.

According to this disclosure, an interleaved buck converter includes a first switch, a second switch, a third switch, a fourth switch, a first inductor, a second inductor, a third inductor, an output capacitor and a controller. The first switch has a first terminal that is used to receive an input voltage, a second terminal and a control terminal. The second switch has a first terminal that is coupled to the first terminal of the first switch, a second terminal and a control terminal. The third switch has a first terminal that is coupled to the second terminal of the first switch, and a second terminal that is coupled to a reference node. The fourth switch has a first terminal that is coupled to the second terminal of the second switch, and a second terminal that is coupled to the reference node. The first inductor has a first terminal that is coupled to the second terminal of the first switch, and a second terminal that is used to provide an output voltage. The second inductor is coupled between the second terminal of the second switch and the second terminal of the first inductor. The third inductor is coupled between the second terminals of the first and second switches. The output capacitor is coupled between the second terminal of the first inductor and the reference node. The controller is coupled to the control terminals of the first and second switches, and controls operation of each of the first and second switches between an ON state and an OFF state such that the first and second switches have the same switching period and the same ON time interval, and such that a time delay from switching of the first switch into the ON state to switching of the second switch into the ON state equals the ON time interval of the first and second switches minus a predetermined time interval.

BRIEF DESCRIPTION OF THE DRAWINGS

Other features and advantages of this disclosure will become apparent in the following detailed description of the embodiment(s) with reference to the accompanying drawings, of which.

DETAILED DESCRIPTION

Figure 1:
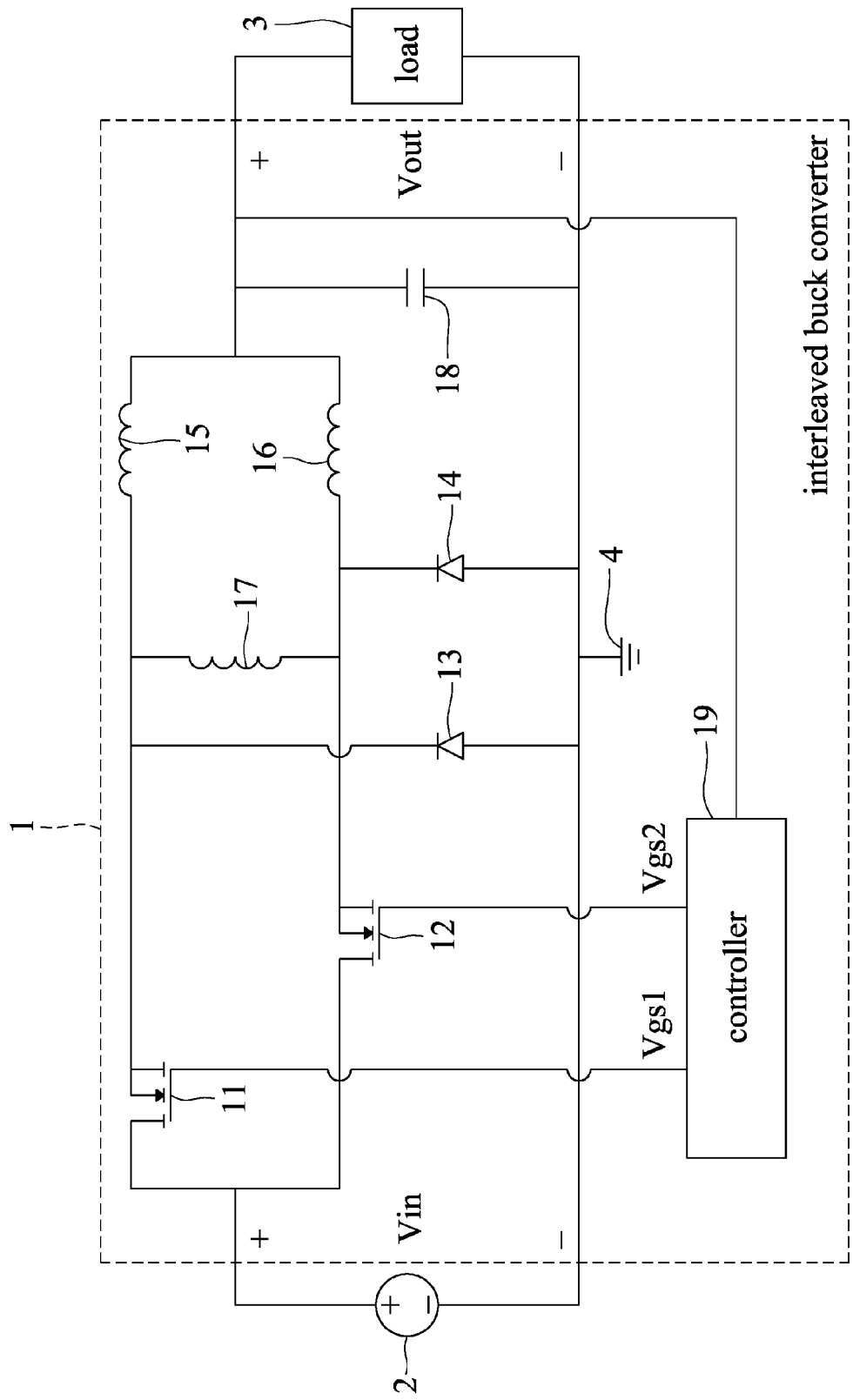
FIG. 1 is a circuit diagram illustrating an embodiment of an interleaved buck converter according to this disclosure.

Referring to FIG. 1, an embodiment of an interleaved buck converter 1 according to this disclosure is used to receive an input voltage (Vin) from a voltage source 2, converts the input voltage (Vin) into an output voltage (Vout) smaller than the input voltage (Vin), and is used to output the output voltage (Vout) to a load 3.

The interleaved buck converter 1 of this embodiment includes a first switch 11, a second switch 12, a third switch 13, a fourth switch 14, a first inductor 15, a second inductor 16, a third inductor 17, an output capacitor 18 and a controller 19.

The first switch 11 has a first terminal that is used to be coupled to the voltage source 2 for receiving the input voltage (Vin) therefrom, a second terminal and a control terminal. In this embodiment, the first switch 11 is an N-type metal oxide semiconductor field effect transistor (nMOSFET) having a drain terminal, a source terminal and a gate terminal that respectively serve as the first, second and control terminals of the first switch 11.

The second switch 12 has a first terminal that is coupled to the first terminal of the first switch 11, a second terminal and a control terminal. In this embodiment, the second switch 12 is an nMOSFET having a drain terminal, a source terminal and a gate terminal that respectively serve as the first, second and control terminals of the second switch 12.

The third switch 13 has a first terminal that is coupled to the second terminal of the first switch 11, and a second terminal that is coupled to a reference node 4 (e.g., ground). In this embodiment, the third switch 13 is a diode having a cathode and an anode that respectively serve as the first and second terminals of the third switch 13.

The fourth switch 14 has a first terminal that is coupled to the second terminal of the second switch 12, and a second terminal that is coupled to the reference node 4. In this embodiment, the fourth switch 14 is a diode having a cathode and an anode that respectively serve as the first and second terminals of the fourth switch 14.

Each of the first to fourth switches 11-14 is operable between an ON state and an OFF state.

The first inductor 15 has a first terminal that is coupled to the second terminal of the first switch 11, and a second terminal that is used to be coupled to the load 3 for providing the output voltage (Vout) thereto. The second inductor 16 is coupled between the second terminal of the second switch 12 and the second terminal of the first inductor 15. The third inductor 17 is coupled between the second terminals of the first and second switches 11, 12. The output capacitor 18 is coupled between the second terminal of the first inductor 15 and the reference node 4.

Figure 2:
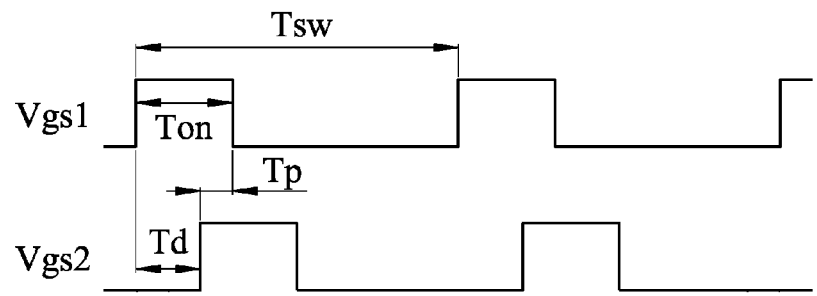
FIG. 2 is a timing diagram illustrating a first control signal and a second control signal respectively for controlling a first switch and a second switch with a duty cycle of 30%.
Figure 3:
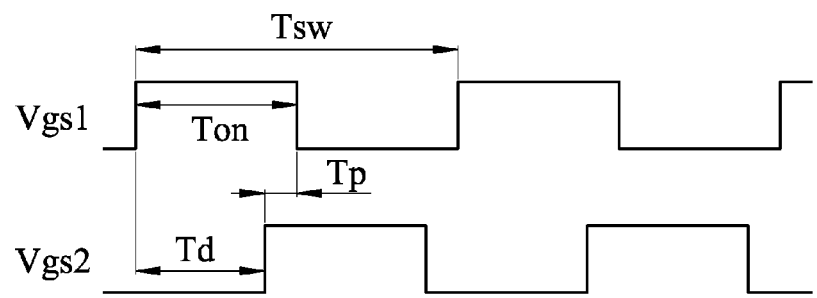
FIG. 3 is a timing diagram illustrating the first and second control signals with a duty cycle of 50%.
Figure 4:
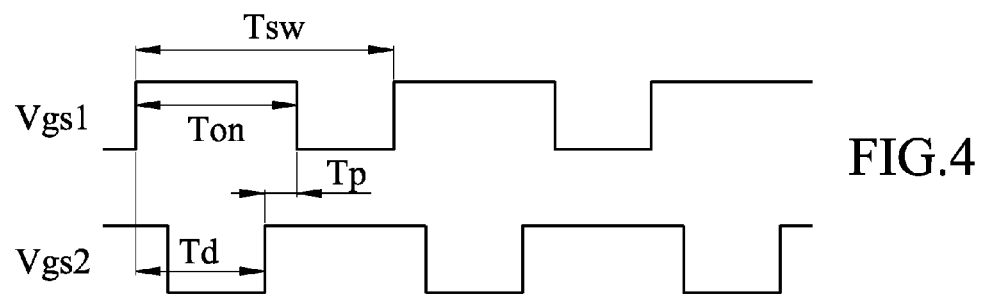
FIG. 4 is a timing diagram illustrating the first and second control signals with a duty cycle of 62.5%.

Referring to FIGS. 1 to 4, the controller 19 is coupled to the second terminal of the first inductor 15 for receiving the output voltage (Vout) therefrom, is coupled further to the control terminals of the first and second switches 11, 12, and generates, based on the output voltage (Vout), a first control signal (Vgs1) and a second control signal (Vgs2) respectively for the first and second switches 11, 12. Each of the first and second control signals (Vgs1, Vgs2) controls operation of the respective one of the first and second switches 11, 12 between the ON state and the OFF state in such a manner as to stabilize the output voltage (Vout) at a predetermined target value. Under the control of the controller 19, the first and second switches 11, 12 have the same switching period of Tsw and the same ON time interval of Ton, a time delay of Td from switching of the first switch 11 into the ON state to switching of the second switch 12 into the ON state equals the ON time interval of the first and second switches 11, 12 minus a predetermined time interval of Tp (i.e., Td=Ton−Tp), and at least one of the switching period and the ON time interval of the first and second switches 11, 12 is variable. In other words, the switching period divided by the ON time interval times 100% of the first and second switches 11, 12 are the same (i.e., the first and second control signals (Vgs1, Vgs2) have the same duty cycle of Ton/Tsw×100%), and the first and second switches 11, 12 are simultaneously in the ON state at least for the predetermined time interval during the switching period thereof. In this embodiment, to stabilize the output voltage (Vout) at the predetermined target value, the controller 19 uses proportional-integral-derivative (PID) control techniques to control, based on the output voltage (Vout), operation of each of the first and second switches 11, 12 between the ON state and the OFF state, where under the control of the controller 19, as shown in FIGS. 3 and 4, when the duty cycle of the first and second control signals (Vgs1, Vgs2) is greater than a predetermined value (e.g., 50%), the switching period of the first and second switches 11, 12 is variable under control of the first and second control signals (Vgs1, Vgs2), and as shown in FIGS. 2 and 3, when the duty cycle of the first and second control signals (Vgs1, Vgs2) is less than the predetermined value (i.e., 50%), the ON time interval of the first and second switches 11, 12 is variable under control of the first and second control signals (Vgs1, Vgs2).

Figure 5:
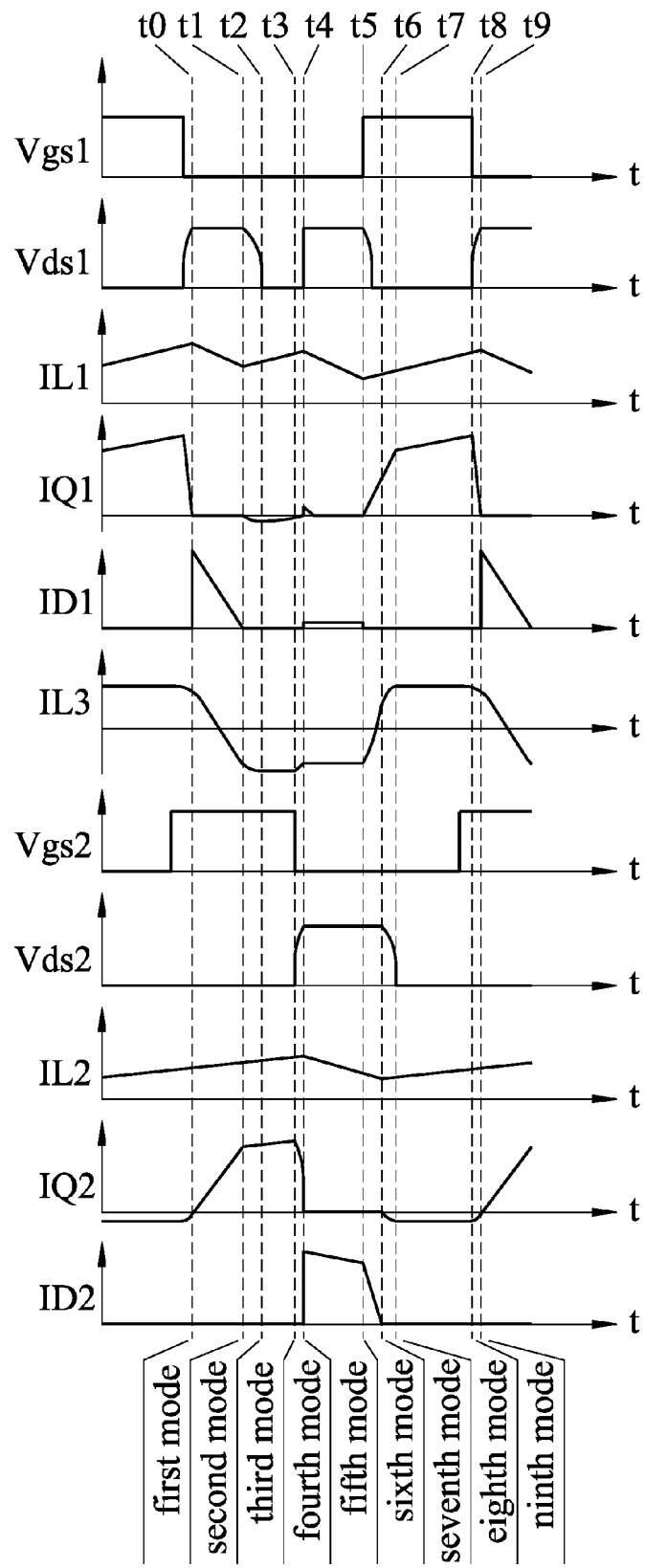
FIG. 5 is a timing diagram illustrating operation of the embodiment.

Referring to FIGS. 5 to 14, when the duty cycle of the first and second control signals (Vgs1, Vgs2) is less than 50%×(1+Tp/Tsw), the interleaved buck converter 1 of this embodiment operates cyclically in first to ninth modes. In FIGS. 6 to 14, an intrinsic diode 111, 121 and a parasitic capacitor 112, 122 of each of the first and second switches 11, 12 are depicted, the controller 19 (see FIG. 1) is not depicted, conducting components are depicted by solid lines, and non-conducting components are depicted by dashed lines. FIG. 5 depicts the first control signal (Vgs1), a voltage (Vds1) across the first switch 11, a current (IL1) flowing through the first inductor 15, a current (IQ1) flowing through the first switch 11, the intrinsic diode 111 of the same or the parasitic capacitor 112 of the same, a current (ID1) flowing through the third switch 13, a current (IL3) flowing through the third inductor 17, the second control signal (Vgs2), a voltage (Vds2) across the second switch 12, a current (IL2) flowing through the second inductor 16, a current (IQ2) flowing through the second switch 12, the intrinsic diode 121 of the same or the parasitic capacitor 122 of the same, and a current (ID2) flowing through the fourth switch 14. It is noted that, in FIG. 5, a waveform of each current (IL1, IQ1, ID1, IL3, IL2, IQ2, ID2) conveys information regarding both magnitude and direction of the current (i.e., positive and negative values of the current indicate opposite directions of the current), and in FIGS. 6 to 14, the direction of each current (IL1, IQ1, ID1, IL3, IL2, IQ2, ID2) is shown by a corresponding arrow.

Figure 6:
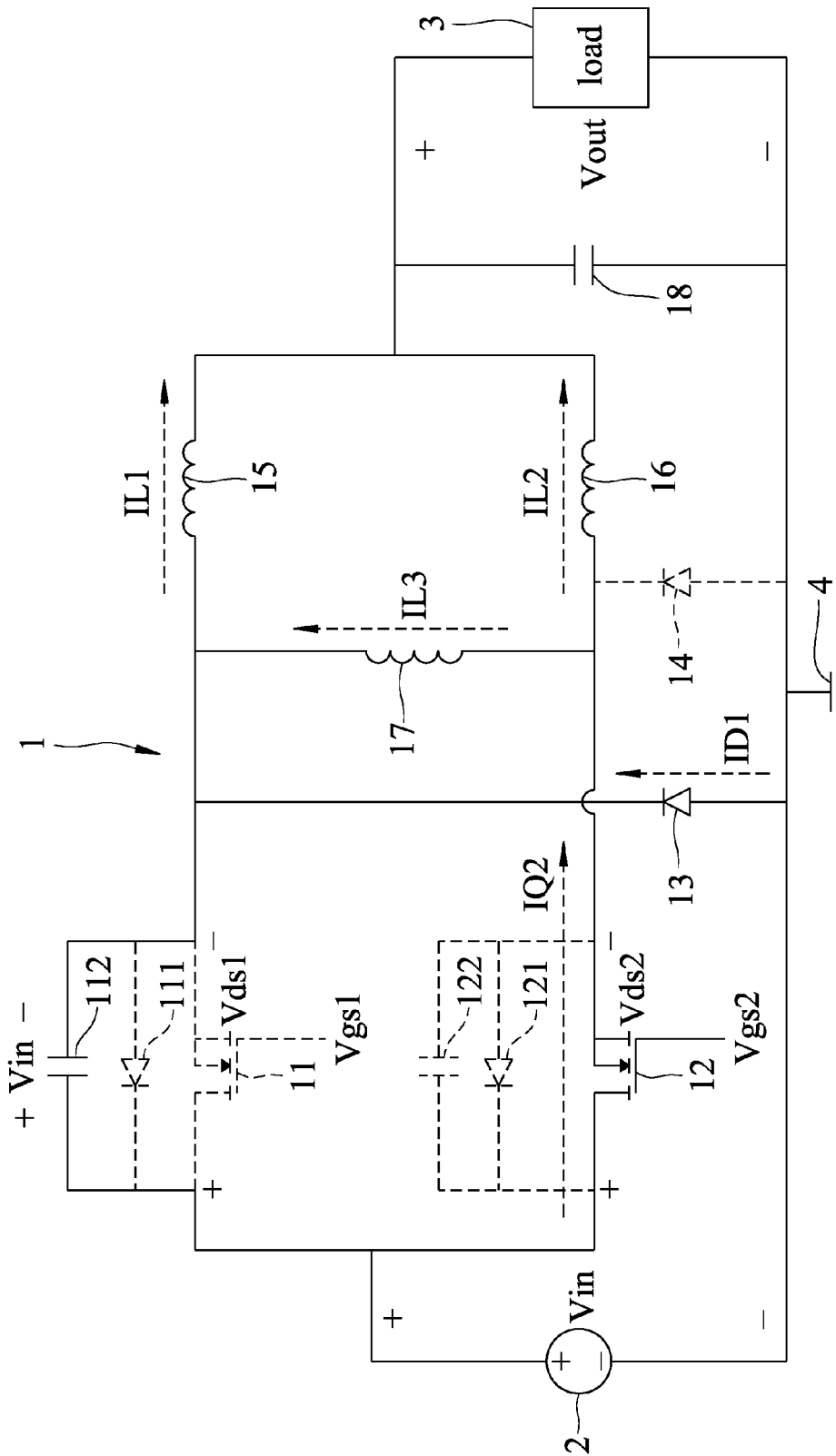
FIGS. 6 to 14 are equivalent circuit diagrams illustrating the embodiment operating in first to ninth modes, respectively.

Referring to FIGS. 5 and 6, the interleaved buck converter 1 of this embodiment operates in the first mode during a period from time t0 to time t1. In the first mode, the first switch 11 is in the OFF state, and the second switch 12 is in the ON state. The third switch 13 enters the ON state, such that the voltage (Vds1) across the first switch 11 is remained at the input voltage (Vin). The fourth switch 14 is in the OFF state. The voltage (Vds2) across the second switch 12 is zero. The magnitude of the current (IL1) flowing through the first inductor 15 gradually decreases. The magnitude of the current (IL2) flowing through the second inductor 16 gradually increases. The magnitude of the current (IL3) flowing through the third inductor gradually decreases from a value equaling the magnitude of the current (IL2) flowing through the second inductor 16 at time t0 to zero, and then the direction of the same reverses and the magnitude of the same gradually increases from zero to a value equaling the magnitude of the current (IL1) flowing through the first inductor 15 at time t1. FIG. 6 only depicts the direction of the current (IL3) flowing through the third inductor 17 after the reversal.

Figure 7:
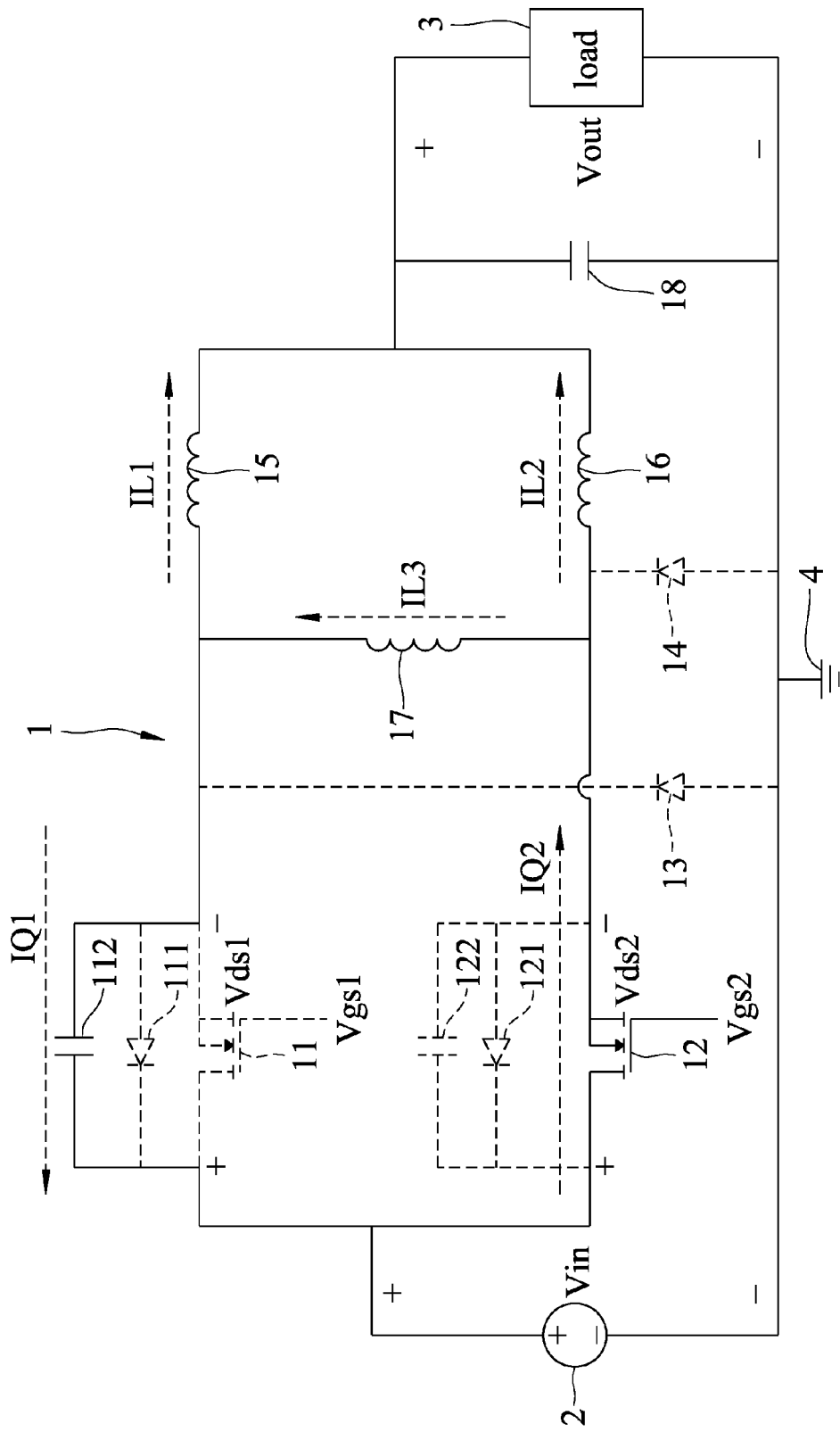

Referring to FIGS. 5 and 7, the interleaved buck converter 1 of this embodiment operates in the second mode during a period from time t1 to time t2. In the second mode, the first switch 11 remains in the OFF state, and the second switch 12 remains in the ON state. The third switch 13 enters the OFF state. The fourth switch 14 remains in the OFF state. The parasitic capacitor 112 of the first switch 11 resonates with the third inductor 17, such that the voltage (Vds1) across the first switch 11 decreases from the input voltage (Vin) to zero. The voltage (Vds2) across the second switch 12 remains at zero. The magnitude of the current (IL1) flowing through the first inductor 15 gradually increases. The magnitude of the current (IL2) flowing through the second inductor 16 gradually increases. The magnitude of the current (IL3) flowing through the third inductor 17 gradually increases.

Figure 8:
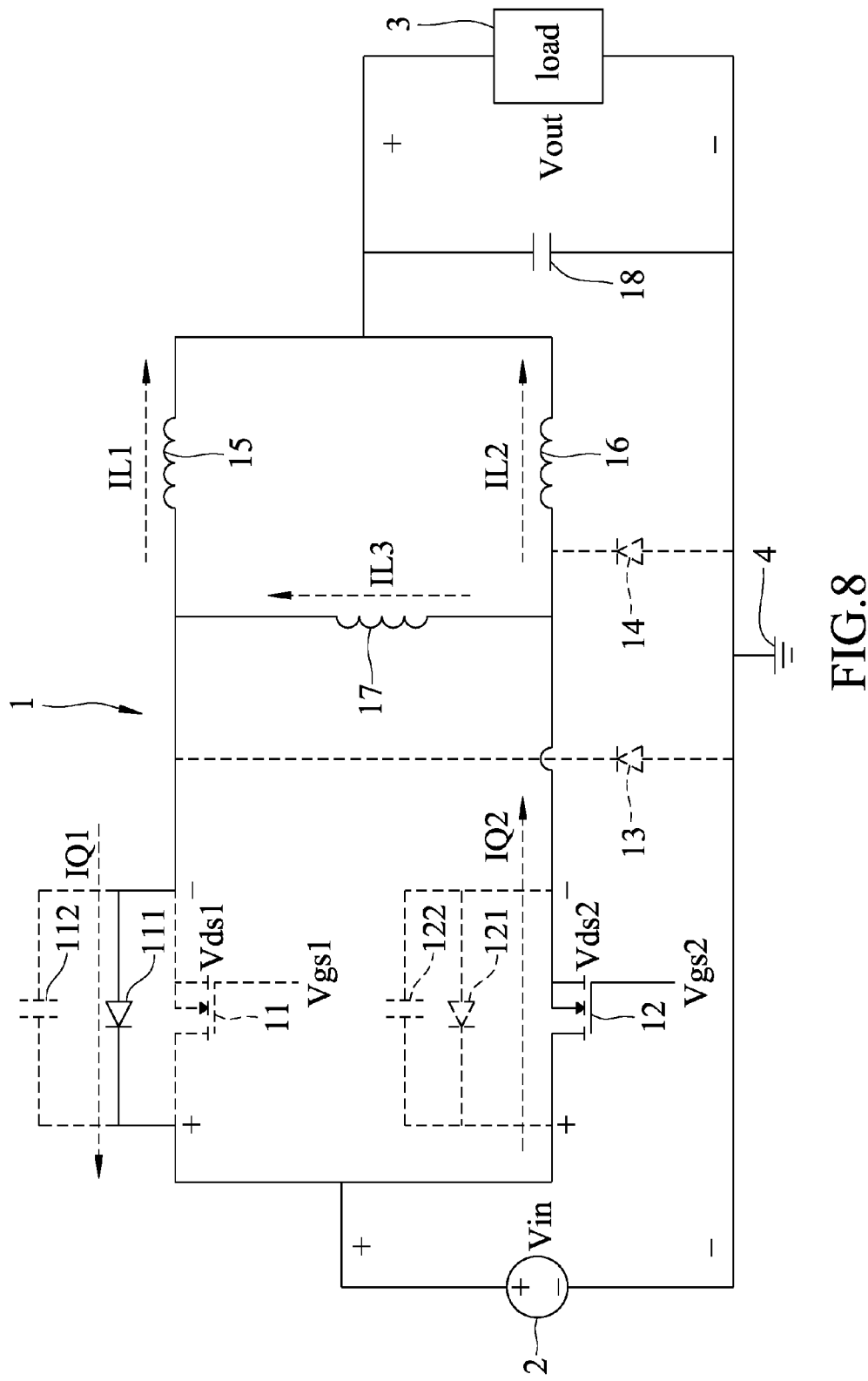

Referring to FIGS. 5 and 8, the interleaved buck converter 1 of this embodiment operates in the third mode during a period from time t2 to time t3. In the third mode, the first switch 11 remains in the OFF state, and the second switch 12 remains in the ON state. The third switch 13 remains in the OFF state. The fourth switch 14 remains in the OFF state. The intrinsic diode 111 of the first switch 11 conducts, such that the voltage (Vds1) across the first switch 11 remains at zero. The voltage (Vds2) across the second switch 12 remains at zero. The magnitude of the current (IL1) flowing through the first inductor 15 gradually increases. The magnitude of the current (IL2) flowing through the second inductor 16 gradually increases. The magnitude of the current (IL3) flowing through the third inductor 17 remains constant.

Figure 9:
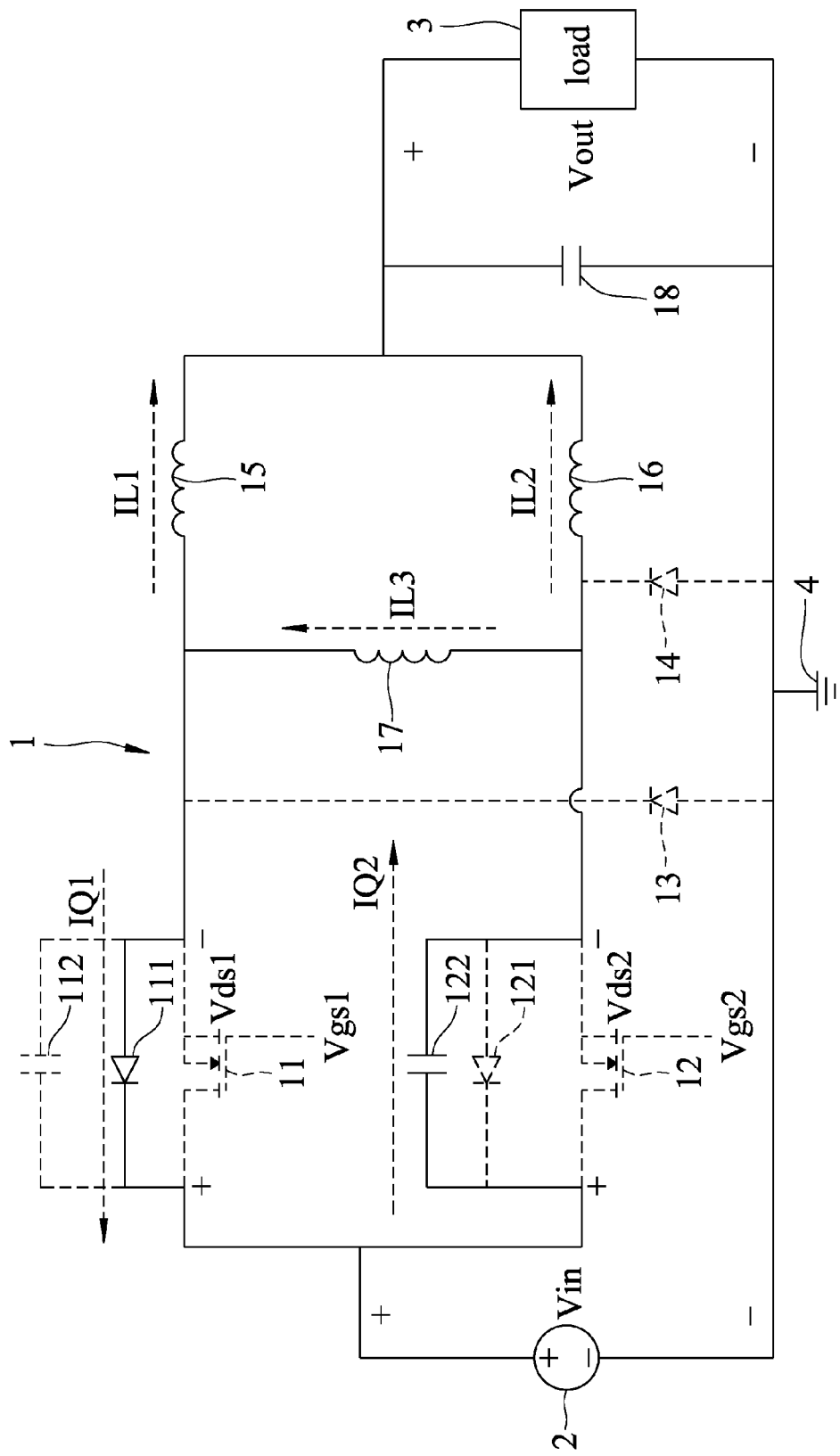

Referring to FIGS. 5 and 9, the interleaved buck converter 1 of this embodiment operates in the fourth mode during a period from time t3 to time t4. In the fourth mode, the first switch 11 remains in the OFF state, and the second switch 12 enters the OFF state. The third switch 13 remains in the OFF state. The fourth switch 14 remains in the OFF state. The intrinsic diode 111 of the first switch 11 conducts, such that the voltage (Vds1) across the first switch 11 remains at zero. The parasitic capacitor 122 of the second switch 12 is charged, such that the voltage (Vds2) across the second switch 12 increases from zero to the input voltage (Vin). The magnitude of the current (IL1) flowing through the first inductor 15 gradually increases. The magnitude of the current (IL2) flowing through the second inductor 16 gradually increases. The magnitude of the current (IL3) flowing through the third inductor 17 gradually decreases to a value less than the magnitude of the current (IL1) flowing through the first inductor 15 at time t4.

Figure 10:
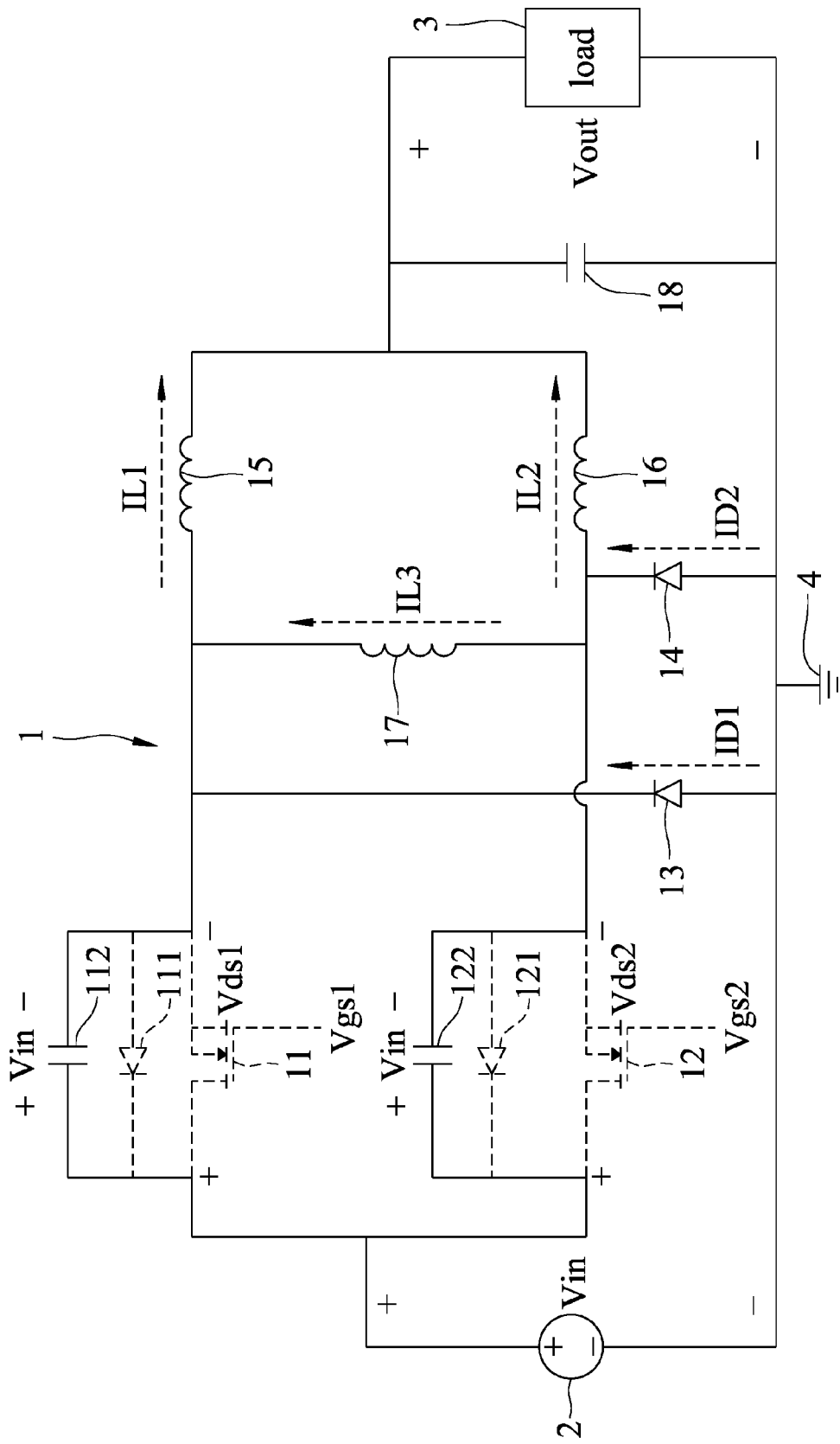

Referring to FIGS. 5 and 10, the interleaved buck converter 1 of this embodiment operates in the fifth mode during a period from time t4 to time t5. In the fifth mode, the first switch 11 remains in the OFF state, and the second switch 12 remains in the OFF state. The third switch 13 enters the ON state, such that the voltage (Vds1) across the first switch 11 increases from zero to the input voltage (Vin). The fourth switch 14 enters the ON state, such that the voltage (Vds2) across the second switch 12 remains at the input voltage (Vin). The magnitude of the current (IL1) flowing through the first inductor 15 gradually decreases to a value equaling the magnitude of the current (IL3) flowing through the third inductor 17 during the period from time t4 to time t5, which remains constant. The magnitude of the current (IL2) flowing through the second inductor 16 gradually decreases.

Figure 11:
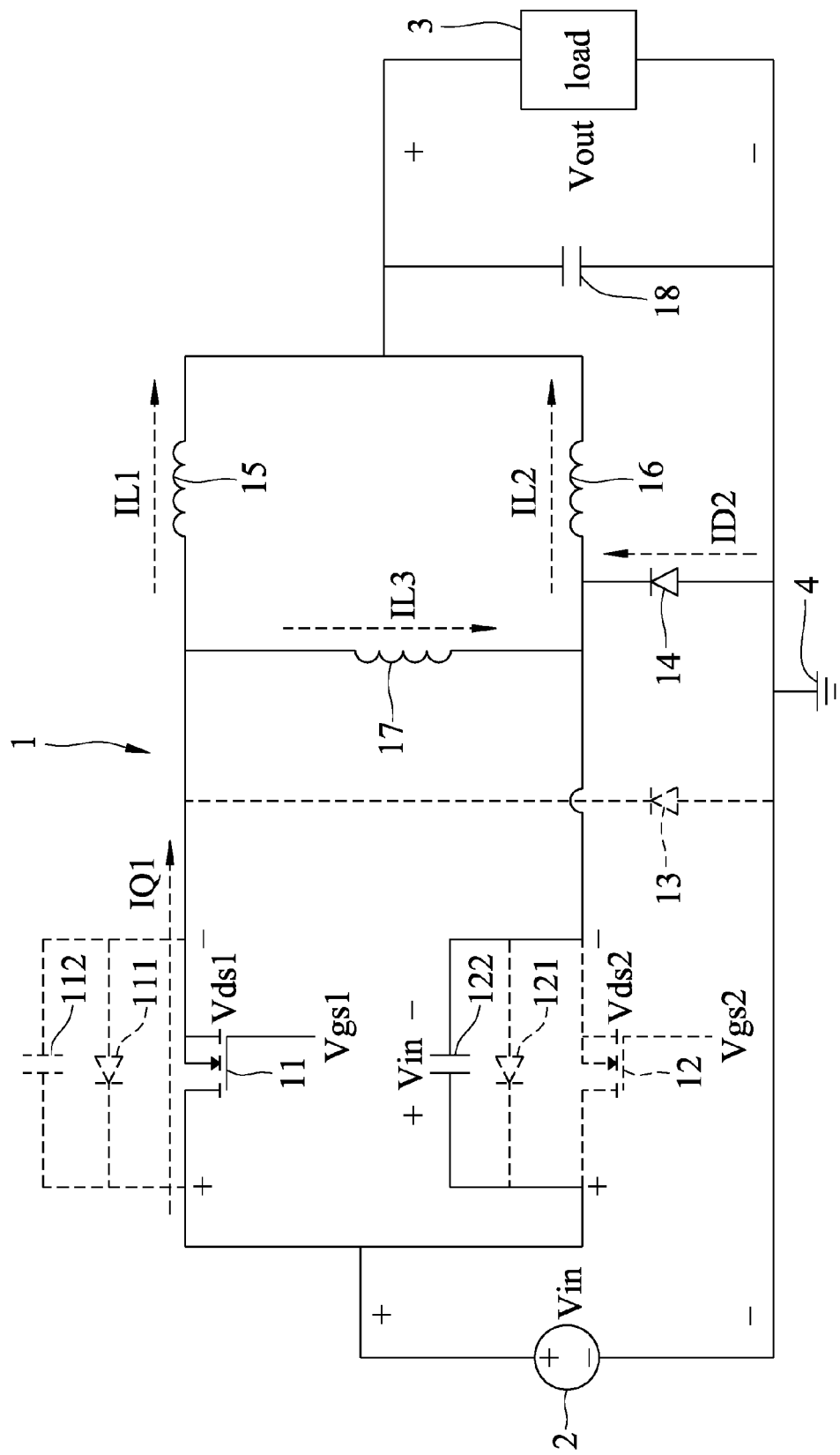

Referring to FIGS. 5 and 11, the interleaved buck converter 1 of this embodiment operates in the sixth mode during a period from time t5 to time t6. In the sixth mode, the first switch 11 enters the ON state, and the second switch 12 remains in the OFF state. The third switch 13 enters the OFF state. The fourth switch 14 remains in the ON state, such that the voltage (Vds2) across the second switch 12 remains at the input voltage (Vin). The voltage (Vds1) across the first switch 11 decreases from the input voltage (Vin) to zero. The magnitude of the current (IL1) flowing through the first inductor 15 gradually increases. The magnitude of the current (IL2) flowing through the second inductor 16 gradually decreases. The magnitude of the current (IL3) flowing through the third inductor 17 gradually decreases from a value equaling the magnitude of the current (IL1) flowing through the first inductor 15 at time t5 to zero, and then the direction of the same reverses and the magnitude of the same gradually increases from zero to a value equaling the magnitude of the current (IL2) flowing through the second inductor 16 at time t6. FIG. 11 only depicts the direction of the current (IL3) flowing through the third inductor 17 after the reversal.

Figure 12:
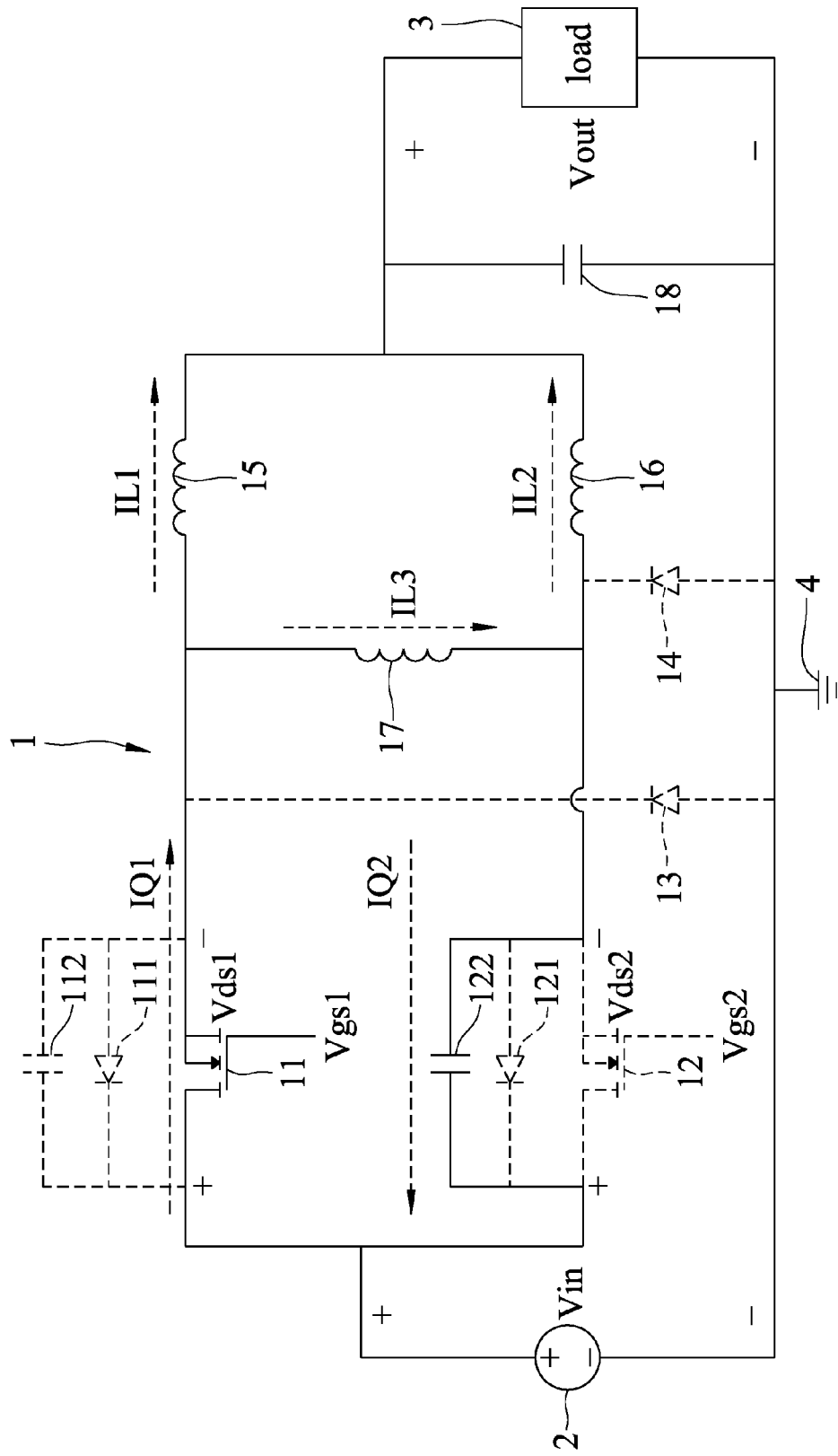

Referring to FIGS. 5 and 12, the interleaved buck converter 1 of this embodiment operates in the seventh mode during a period from time t6 to time t7. In the seventh mode, the first switch 11 remains in the ON state, and the second switch 12 remains in the OFF state. The third switch 13 remains in the OFF state. The fourth switch 14 enters the OFF state. The voltage (Vds1) across the first switch 11 remains at zero. The parasitic capacitor 122 of the second switch 12 resonates with the third inductor 17, such that the voltage (Vds2) across the second switch 12 decreases from the input voltage (Vin) to zero. The magnitude of the current (IL1) flowing through the first inductor 15 gradually increases. The magnitude of the current (IL2) flowing through the second inductor 16 gradually increases. The magnitude of the current (IL3) flowing through the third inductor 17 gradually increases.

Figure 13:
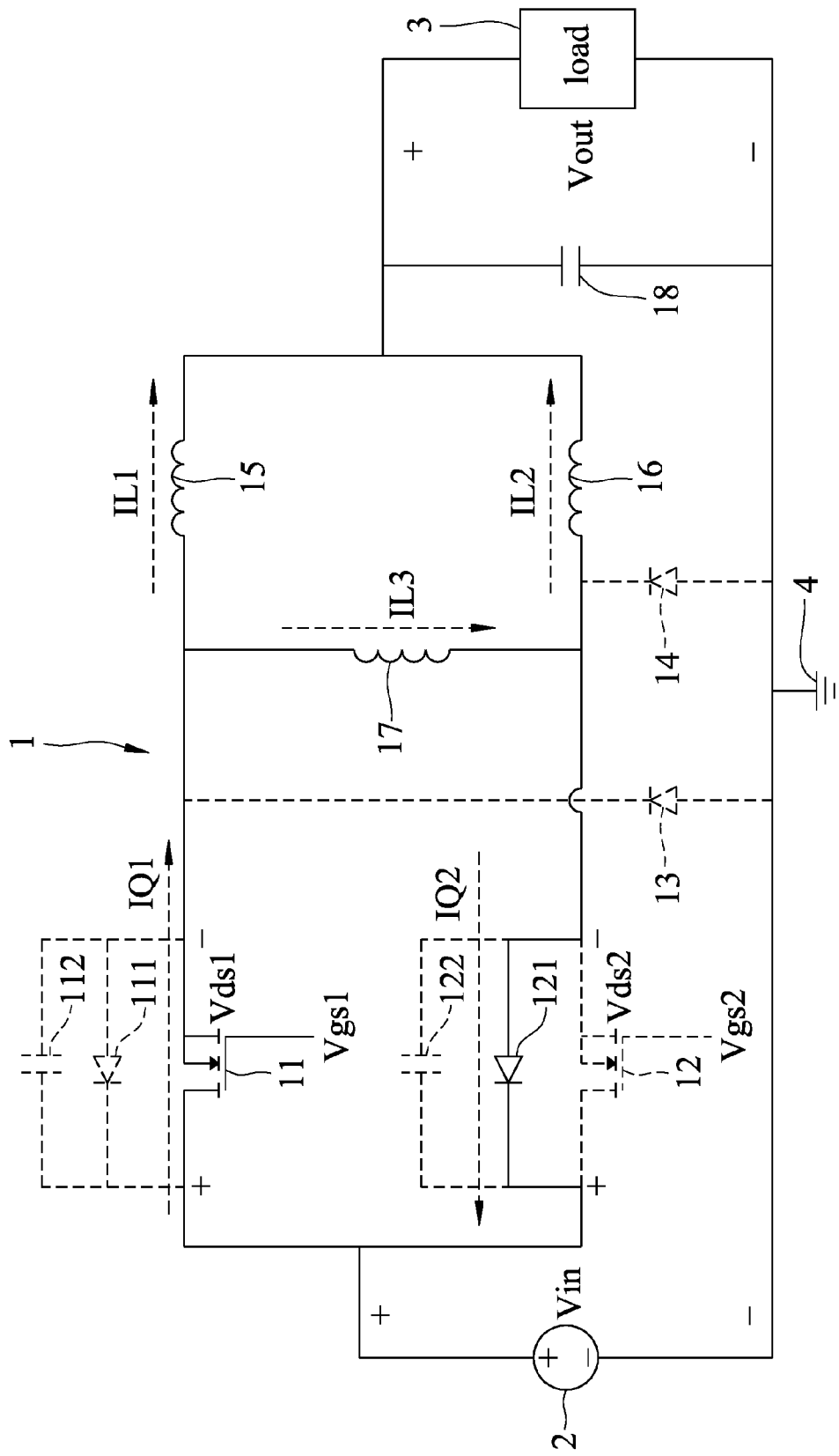

Referring to FIGS. 5 and 13, the interleaved buck converter 1 of this embodiment operates in the eighth mode during a period from time t7 to time t8. In the eighth mode, the first switch 11 remains in the ON state, and the second switch 12 initially remains in the OFF state and then enters the ON state. The third switch 13 remains in the OFF state. The fourth switch 14 remains in the OFF state. The voltage (Vds1) across the first switch 11 remains at zero. The intrinsic diode 121 of the second switch 12 conducts, such that the voltage (Vds2) across the second switch 12 remains at zero, and such that the second switch 12 enters the ON state with zero voltage switching (ZVS). The magnitude of the current (IL1) flowing through the first inductor 15 gradually increases. The magnitude of the current (IL2) flowing through the second inductor 16 gradually increases. The magnitude of the current (IL3) flowing through the third inductor 17 is constant. FIG. 13 only depicts the second switch 12 operating in the OFF state.

Figure 14:
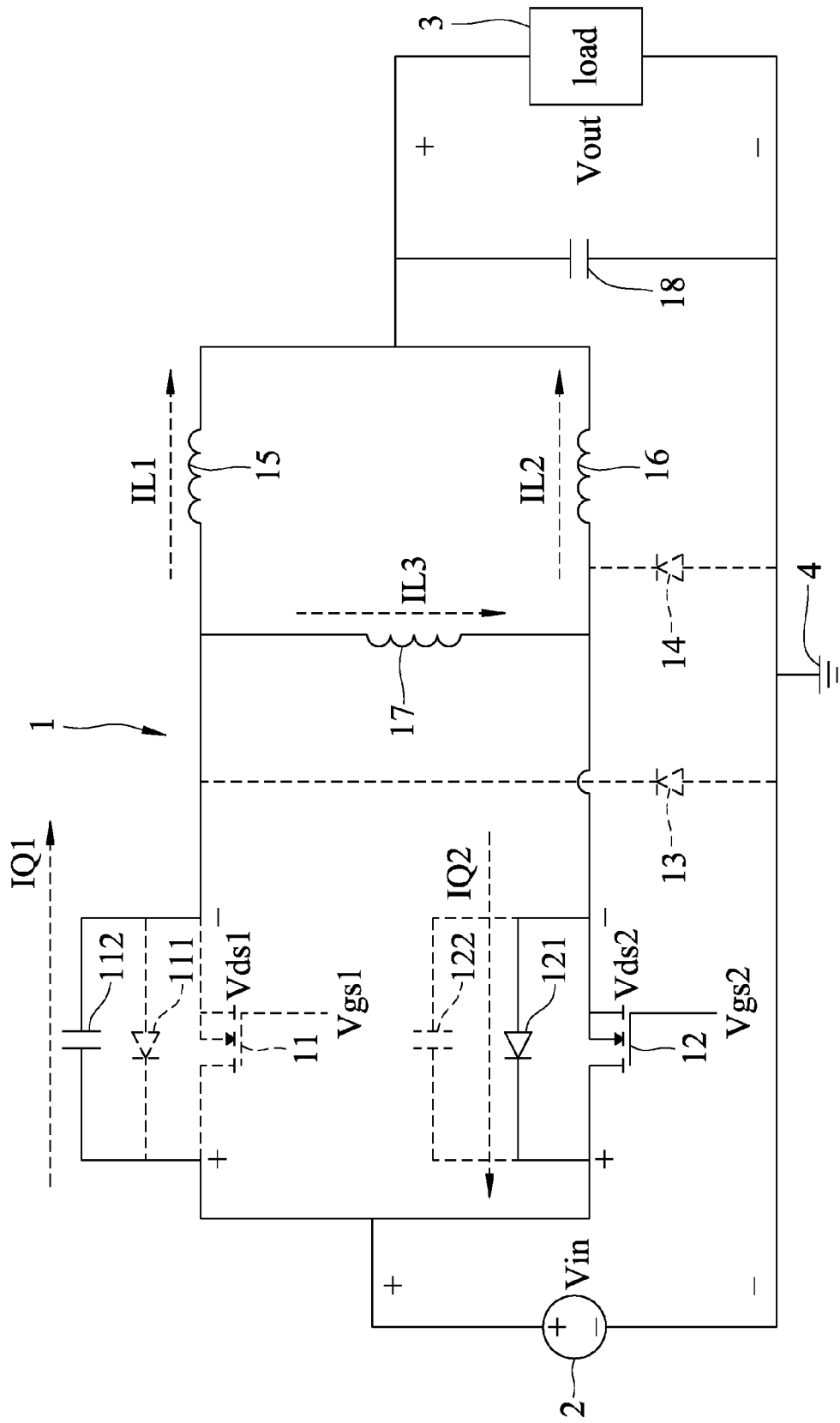

Referring to FIGS. 5 and 14, the interleaved buck converter 1 of this embodiment operates in the ninth mode during a period from time t8 to time t9. In the ninth mode, the first switch 11 enters the OFF state, and the second switch 12 remains in the ON state. The third switch 13 remains in the OFF state. The fourth switch 14 remains in the OFF state. The parasitic capacitor 112 of the first switch 11 is charged, such that the voltage (Vds1) across the first switch 11 increases from zero to the input voltage (Vin). The intrinsic diode 121 of the second switch 12 conducts, such that the voltage (Vds2) across the second switch 12 remains at zero. The magnitude of the current (IL1) flowing through the first inductor 15 gradually increases. The magnitude of the current (IL2) flowing through the second inductor 16 gradually increases. The magnitude of the current (IL3) flowing through the third inductor 17 gradually decreases.

Referring to FIG. 1, it is noted that those skilled in the art can infer from the description above the operation of the interleaved buck converter 1 of this embodiment and that the first and second switches 11, 12 enter the ON state with ZVS when the duty cycle of the first and second control signals (Vgs1, Vgs2) for controlling operation of the first and second switches 11, 12 is greater than $50\% \times (1+Tp/Tsw)$, and therefore further details of the same are omitted herein for the sake of brevity.

In view of the above, with the time delay from switching of the first switch 11 into the ON state to switching of the second switch 12 into the ON state equaling the ON time interval of the first and second switches 11, 12 minus the predetermined time interval, the second switch 12 enters the ON state with ZVS when the duty cycle of the first and second control signals (Vgs1, Vgs2) for controlling operation of the first and second switches 11, 12 is less than $50\% \times (1+Tp/Tsw)$. Therefore, the interleaved buck converter 1 of this embodiment has relatively high conversion efficiency when the duty cycle of the first and second control signals (Vgs1, Vgs2) is small.

It is noted that, in other embodiments of this disclosure, each of the third and fourth switches 13, 14 may be an nMOSFET. In this case, the controller 19 is coupled further to the third and fourth switches 13, 14, and controls operation of each of the third and fourth switches 13, 14 between the ON state and the OFF state.

While this disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An interleaved buck converter comprising:
a first switch having a first terminal that is used to receive an input voltage, a second terminal and a control terminal;
a second switch having a first terminal that is coupled to said first terminal of said first switch, a second terminal and a control terminal;
a third switch having a first terminal that is coupled to said second terminal of said first switch, and a second terminal that is coupled to a reference node;
a fourth switch having a first terminal that is coupled to said second terminal of said second switch, and a second terminal that is coupled to the reference node;
a first inductor having a first terminal that is coupled to said second terminal of said first switch, and a second terminal that is used to provide an output voltage;
a second inductor coupled between said second terminal of said second switch and said second terminal of said first inductor;
a third inductor coupled between said second terminals of said first and second switches;
an output capacitor coupled between said second terminal of said first inductor and the reference node; and
a controller coupled to said control terminals of said first and second switches, and controlling operation of each of said first and second switches between an ON state and an OFF state such that said first and second switches have the same switching period and the same ON time interval, and such that a time delay from switching of said first switch into the ON state to switching of said second switch into the ON state equals the ON time intervals of said first and second switches minus a predetermined time interval, a value of the time delay being a function of a duty cycle of operation of said first and second switches.

2. The interleaved buck converter of claim 1, wherein said controller is coupled further to said second terminal of said first inductor for receiving the output voltage therefrom, and controls, based on the output voltage, operation of each of said first and second switches between the ON state and the OFF state so that at least one of the switching period and the ON time interval of said first and second switches is variable.

3. The interleaved buck converter of claim 2, wherein said controller uses proportional-integral-derivative control techniques to control, based on the output voltage, operation of each of said first and second switches between the ON state and the OFF state.

4. The interleaved buck converter of claim 1, wherein each of said first and second switches is an N-type metal oxide semiconductor field effect transistor (nMOSFET).

5. The interleaved buck converter of claim 4, wherein said nMOSFET has a drain terminal, a source terminal and a gate terminal that respectively serve as said first, second and third terminals of a respective one of said first and second switches.

6. The interleaved buck converter of claim 1, wherein each of said third and fourth switches is a diode.

7. The interleaved buck converter of claim 6, wherein said diode has a cathode and an anode that respectively serve as said first and second terminals of a respective one of said third and fourth switches.

8. The interleaved buck converter of claim 1, wherein the controller varies (1) the switching period of said first and second switches responsive to the duty cycle of operation of said first and second switches being greater than a predetermined value, or (2) the ON time interval of said first and second switches responsive to the duty cycle of operation of said first and second switches being less than the predetermined value.

9. An interleaved buck converter comprising:
a first switch having a first terminal that is used to receive an input voltage, a second terminal and a control terminal;
a second switch having a first terminal that is coupled to said first terminal of said first switch, a second terminal and a control terminal;
a third switch having a first terminal that is coupled to said second terminal of said first switch, and a second terminal that is coupled to a reference node;
a fourth switch having a first terminal that is coupled to said second terminal of said second switch, and a second terminal that is coupled to the reference node;
a first inductor having a first terminal that is coupled to said second terminal of said first switch, and a second terminal that is used to provide an output voltage;
a second inductor coupled between said second terminal of said second switch and said second terminal of said first inductor;
a third inductor coupled between said second terminals of said first and second switches;
an output capacitor coupled between said second terminal of said first inductor and the reference node; and
a controller coupled to said control terminals of said first and second switches, and controlling operation of each of said first and second switches between an ON state and an OFF state such that said first and second switches have the same switching period and the same ON time interval, and such that a time delay from switching of said first switch into the ON state to switching of said second switch into the ON state equals the ON time intervals of said first and second switches minus a predetermined time interval, said controller is coupled further to said second terminal of said first inductor for receiving the output voltage therefrom, and controls, based on the output voltage, operation of each of said first and second switches between the ON state and the OFF state so that when the ON time interval divided by the switching period times 100% is greater than a predetermined value, the switching period of said first and second switches is variable; and when the ON time interval divided by the switching period times 100% is less than the predetermined value, the ON time interval of said first and second switches is variable.

* * * * *